(12) United States Patent
Furuki

(10) Patent No.: US 11,936,319 B2
(45) Date of Patent: Mar. 19, 2024

(54) CURRENT CONTROL CIRCUIT AND INPUT DEVICE

(71) Applicant: ALPS ALPINE CO., LTD., Tokyo (JP)

(72) Inventor: Shigeru Furuki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 438 days.

(21) Appl. No.: 17/341,744

(22) Filed: Jun. 8, 2021

(65) Prior Publication Data

US 2021/0297032 A1    Sep. 23, 2021

Related U.S. Application Data

(63) Continuation of application No. PCT/JP2019/048237, filed on Dec. 10, 2019.

(30) Foreign Application Priority Data

Jan. 28, 2019 (JP) .................... 2019-012557

(51) Int. Cl.
*H02P 29/40* (2016.01)

(52) U.S. Cl.
CPC .......... *H02P 29/40* (2016.02); *H02P 2209/09* (2013.01)

(58) Field of Classification Search
CPC .................... H02P 29/40; H02P 2209/09
USPC ........................................ 318/599
See application file for complete search history.

(56) References Cited

U.S. PATENT DOCUMENTS

| 7,208,893 | B2 | 4/2007 | Furuki | |
|---|---|---|---|---|
| 7,911,168 | B2 | 5/2011 | Koike | |
| 2006/0158140 | A1* | 7/2006 | Furuki | ............. H02P 5/68 |
| | | | | 318/68 |
| 2008/0203964 | A1* | 8/2008 | Koike | ......... G03G 15/5008 |
| | | | | 318/434 |

FOREIGN PATENT DOCUMENTS

| JP | H02-070288 | 3/1990 |
|---|---|---|
| JP | 2006-197669 | 7/2006 |
| JP | 2008-109835 | 5/2008 |
| JP | 2009-131128 | 6/2009 |

OTHER PUBLICATIONS

Takano et al. (WO 2014162862 A1) "Power Tool" Date Published Oct. 9, 2014 (Year: 2014).*
Watanabe et al. (JP 2009131128 A) "Motor Controller" Date Published Jun. 11, 2009 (Year: 2009).*
Suzuki K JP-2009131128-A (Jun. 11, 2009) (Year: 2009).*
International Search Report for PCT/JP2019/048237 dated Feb. 10, 2020.

* cited by examiner

*Primary Examiner* — Jorge L Carrasquillo
(74) *Attorney, Agent, or Firm* — IPUSA, PLLC

(57) ABSTRACT

A current control circuit for controlling a drive current supplied to an inductive load is provided. The current control circuit is configured to perform a first mode of controlling a duty of the drive current so as to be 100% until a current value of the drive current reaches a first target current value after a supply of the drive current is started, and a second mode of controlling the duty of the drive current to be a predetermined duty below 100% until the current value of the drive current reaches a second target current value that is greater than the first target current value after the current value of the drive current reaches the first target current value.

5 Claims, 3 Drawing Sheets

CURRENT CONTROL CIRCUIT AND INPUT DEVICE

CROSS-REFERENCE TO RELATED APPLICATIONS

The present application is a continuation application of International Application No. PCT/JP2019/048237, filed Dec. 10, 2019, which claims priority to Japanese Patent Application No. 2019-012557, filed Jan. 28, 2019. The contents of these applications are incorporated herein by reference in their entirety.

BACKGROUND OF THE INVENTION

1. Field of the Invention

The present invention relates to a current control circuit and input device.

2. Description of the Related Art

Patent Document 1 discloses a technique for a motor drive control apparatus including a switch for turning on and off a current flowing through a motor and a holding circuit for holding an on-state of the switch. When a polarity change portion of the on-signal is detected to come, the switch is held to be in the on-state. When the drive current of the motor reaches a target current value, a drive current value is maintained to be a predetermined value by releasing from the holding the on-state of the switch means.

BACKGROUND ART DOCUMENTS

Patent Document

[Patent Document 1]
Japanese Laid-Open Patent Application No. 2006-197669

SUMMARY OF THE INVENTION

However, the inventors have found that by limiting the duty of the drive current supplied to the inductive load of a motor or the like, it is possible to suppress a failure that may occur when the duty of the drive current is high (e.g., generation of an offensive noise, unstable duty, etc.). However, limiting the duty of the drive current may increase the rise time for starting up the inductive load. For example, in an input device capable of providing a user with a sense of operation by operation of a motor, when the start-up time of the motor increases, the response of the motor operation to the user operation is delayed, and a sense of discomfort is likely to be caused to the user.

There is provided a current control circuit for controlling a drive current supplied to an inductive load. In a first mode, the current control circuit is configured to perform a first mode of controlling a duty of the drive current so as to be 100% until a current value of the drive current reaches a first target current value after a supply of the drive current is started. In a second mode, the duty of the drive current is controlled so as to be a predetermined duty below 100% until the current value of the drive current reaches a second target current value that is greater than the first target current value after the current value of the drive current reaches the first target current value.

DETAILED DESCRIPTION OF THE PREFERRED EMBODIMENTS

Hereinafter, an embodiment will be described with reference to the drawings.

[Circuit Structure of the Current Control Circuit]

Figure 1:
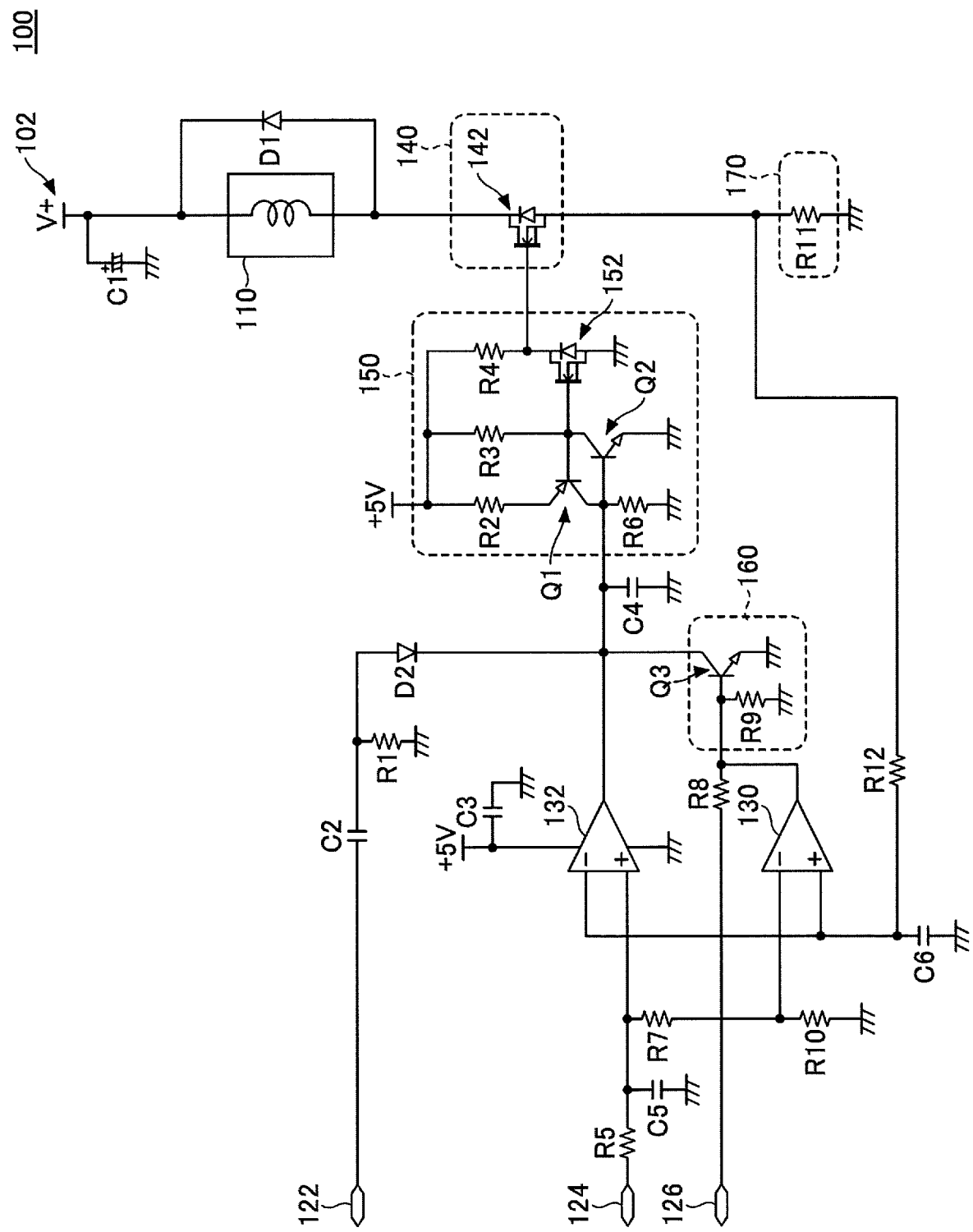
FIG. 1 is a diagram illustrating the circuit structure of a current control circuit according to an embodiment of the present invention.

FIG. 1 is a diagram illustrating the circuit structure of a current control circuit 100 according to an embodiment of the present invention. The current control circuit 100 illustrated in FIG. 1 is a circuit that controls the drive current supplied to the electromagnetic actuator 110 (an example of an "inductive load") to control driving of the electromagnetic actuator 110.

As illustrated in FIG. 1, the current control circuit 100 includes an on-signal output unit 122, a target value signal output unit 124, an off-signal output unit 126, a first comparison unit 130, a second comparison unit 132, a first switch unit 140, a holding circuit 150, a second switch unit 160, and a current sensing unit 170.

The on-signal output unit 122 outputs an on-signal (a pulse signal that temporarily becomes the high-level) at a predetermined interval for switching "on" the supply of the drive current to the electromagnetic actuator 110. The on-signal output from the on-signal output unit 122 is input into the holding circuit 150.

The target value signal output unit 124 outputs a target value signal representing a voltage value corresponding to the target current value of the drive current of the electromagnetic actuator 110. The target value signal output from the target value signal output unit 124 is input to the second comparison unit 132 as a target value signal representing a voltage value corresponding to the second target current value, and is divided by a resistor R7 and a resistor R10 so as to be input into the first comparison unit 130 as a target value signal representing a voltage value corresponding to the first target current value. This property indicates the voltage value corresponding to the first target current value as "a first target voltage value" and the voltage value corresponding to the second target current value as "a second target voltage value".

The off-signal output unit 126 outputs an off-signal (a pulse signal that temporarily reaches the high-level) at a predetermined interval to switch off the supply of the drive current to the electromagnetic actuator 110. The off-signal output from the off-signal output unit 126 is input to the second switch unit 160.

Figure 2:
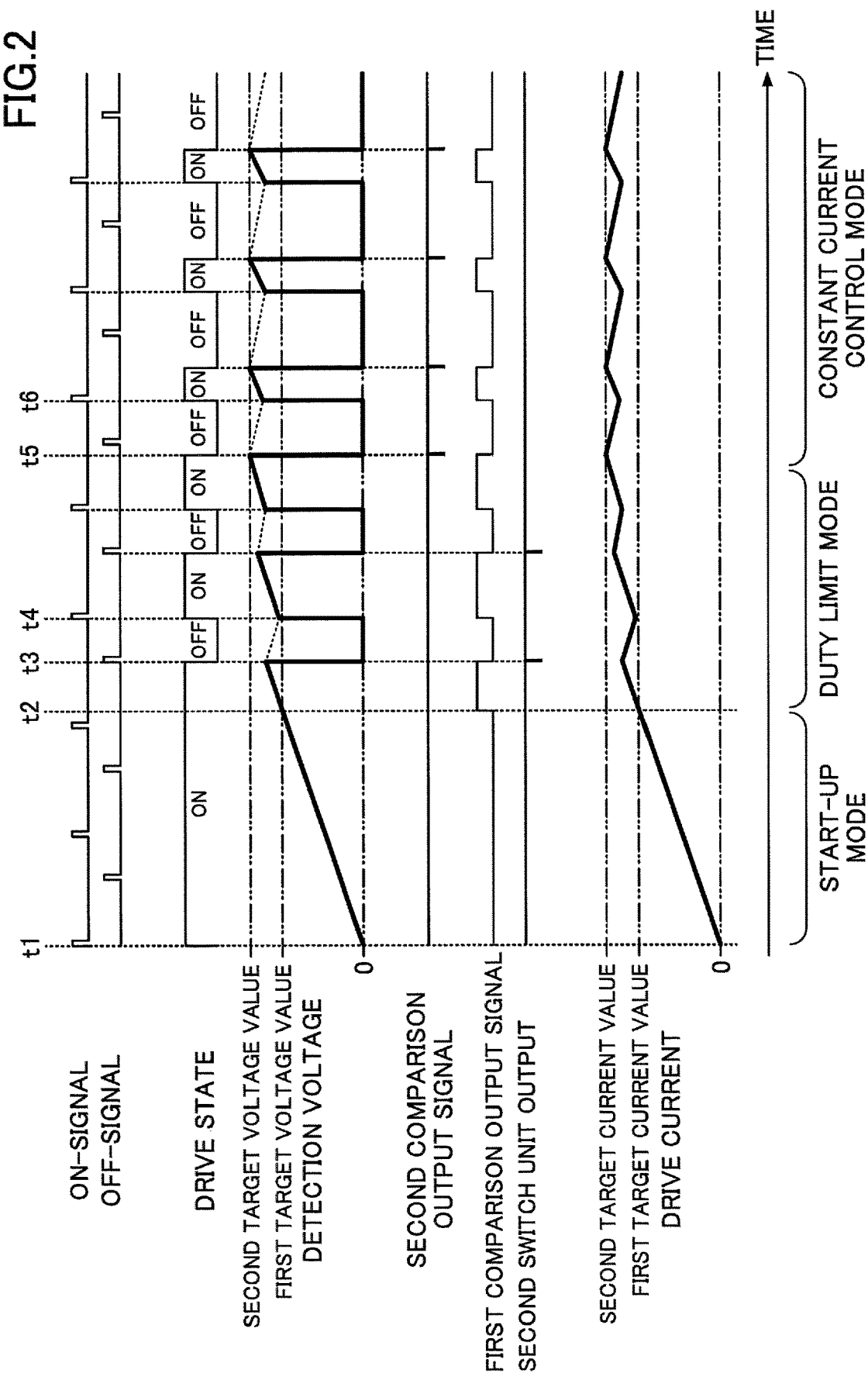
FIG. 2 is a timing chart representing various operation timings in the current control circuit according to the embodiment of the present invention.

As illustrated in FIG. 2, the interval of the on-signal output from the on-signal output unit 122 and the interval of the off-signal output from the off-signal output unit are the same. However, a phase difference occurs between the output timing of the on-signal and the output timing of the off-signal so that the ratio of an on-period has a duty as desired (for example, 60% in this embodiment).

The current sensing unit 170 detects the current value of the drive current flowing through the electromagnetic actuator 110. The current sensing unit 170 is configured to include a resistor R11. The resistor R11 is connected at one end to the source terminal of MOSFET 142 and at the other end to the ground. Said differently, the resistor R11 is connected in series with the electromagnetic actuator 110 via the MOSFET 142. Thus, the voltage between the terminals of the resistor R11 has a voltage value corresponding to the current value of the drive current flowing through the electromagnetic actuator 110. The voltage between the terminals of resistor R11 is hereinafter referred to as a "detected voltage value".

The first comparison unit 130 is implemented by a comparator. The non-inverting input terminal (+) of the first comparison unit 130 is connected to the resistor R11 included in the current sensing unit 170, and a detected voltage value, detected by the current sensing unit 170, is input. The inverting input terminal (−) of the first comparison unit 130 is connected to a target value signal output unit 124 (specifically, the inverting input terminal (−) of the first comparison unit 130 is connected between a resistor R7 and a resistor R10 that are connected to the target value signal output unit 124 in series). The inverting input terminal (−) of the first comparison unit 130 receives a target value signal output from the target value signal output unit 124 (a target value signal representing a first target voltage value lower than the second target voltage value when the target value signal is divided by the resistor R7 and the resistor R10). The first comparison unit 130 outputs, from an output terminal, a comparison output signal (an example of a "first comparison output signal") between a detection voltage value input from the non-inverting input terminal (+) and a target value signal input from the inverting input terminal (−). Specifically, when the detected voltage value input from the non-inverting input terminal (+) is below the first target voltage value indicated by the target value signal input from the inverting input terminal (−), the first comparison unit 130 outputs the low-level comparative output signal from the output terminal and supplies the low-level comparative output signal to the second switch unit 160. On the other hand, when the detected voltage value input from the non-inverting input terminal (+) is larger than the first target voltage value indicated by the target value signal input from the inverting input terminal (−), the first comparison unit 130 outputs the comparison output signal of the high-level from the output terminal and supplies it to the second switch unit 160. Comparing the first target voltage value with the detected voltage value is substantially equivalent to comparing the first target current value with the current value of the drive current flowing through the electromagnetic actuator 110.

The second switch unit 160 is connected to the input end of the holding circuit 150 and controls the supply of the off-signal to the holding circuit 150. In this embodiment, a NAND circuit configured by combining a transistor Q3 and a resistor R9 is used as the second switch unit 160. Each of the off-signal output unit 126, the output terminal of the first comparison unit 130, and the resistor R9 is connected to the base terminal of the transistor Q3. The collector terminal of the transistor Q3 is connected to the input terminal of the holding circuit 150. The emitter terminal of the transistor Q3 is grounded. The second switch unit 160 outputs the off-signal supplied from the off-signal output unit 126 and the NAND signal output from the first comparison unit 130 from the collector terminal of the transistor Q3 and supplies these to the holding circuit 150. That is, when the off-signal is output from the off-signal output unit 126 in conjunction with the comparison output signal output from the first comparison unit 130 being at the high-level (that is, when the detected voltage value detected by the current sensing unit 170 is greater than the first target voltage value), the second switch unit 160 outputs the low-level NAND signal (the off-signal) from the collector terminal of the transistor Q3 to the holding circuit 150 and supplies the low-level NAND signal (the off-signal) from the collector terminal of the transistor Q3 to the holding circuit 150, and otherwise outputs the high-level NAND signal (the on-signal) and supplies it to the holding circuit 150. The low-level NAND signal output from the second switch unit 160 releases the state of the holding circuit 150 from holding and effectively activates the off-signal output from the off-signal output unit 126.

The second comparison unit 132 is implemented by a comparator. The non-inverting input terminal (+) of the second comparison unit 132 is connected to the target value signal output unit 124, and a target value signal (a target value signal representing the second target voltage value), output from the target value signal output unit 124, is input. The inverting input terminal (−) of the second comparison unit 132 is connected to one end of a resistor R11 provided by the current sensing unit 170, and a detected voltage value, detected by the current sensing unit 170, is input. The second comparison unit 132 outputs, from the output terminal, the comparative output signal (an example of the "second comparative output signal") that is obtained by comparing the second target voltage value indicated by a target value signal inputted from the non-inverting input terminal (+) with a detected voltage value inputted from the inverting input terminal (−). Specifically, when the detected voltage value input from the inverting input terminal (−) is smaller than the second target voltage value indicated by the target value signal, input from the non-inverting input terminal (+), the second comparison unit 132 outputs the high-level comparison output signal (on-signal) from the output terminal and supplies the high-level comparison output signal (on-signal) to the holding circuit 150. Conversely, when the detected voltage value input from the inverting input terminal (−) is larger than the second target voltage value, indicated by the target value signal input from the non-inverting input terminal (+), the second comparison unit 132 outputs the low-level comparison output signal (off-signal) from the output terminal to the holding circuit 150. The low-level comparative output signal output from the second comparison unit 132 is used to release the holding circuit 150 from holding the on-state. Incidentally, comparing the second target voltage value with the detected voltage value is substantially equivalent to comparing the second target current value with the current value of the drive current flowing through the electromagnetic actuator 110.

The holding circuit 150 is a circuit that holds the on-state of the supply of the drive current to the electromagnetic actuator 110. The holding circuit 150 is configured to have two transistors Q1 and Q2, four resistors R2, R3, R4 and R6, and a MOSFET 152. The input terminal of the holding circuit 150 is connected to the output terminal of the on-signal output unit 122, the output terminal of the second comparison unit 132, and the collector terminal of the second switch unit 160. The output terminal of the holding circuit 150 is connected to the gate terminal of the MOSFET 142 included in the first switch unit 140.

The holding circuit 150 switches to the on-state when an on-signal, output from the on-signal output unit 122, is supplied from the input terminal and holds the on-state. The holding circuit 150 applies an on voltage (a voltage greater than or equal to the gate threshold voltage) to the gate terminal of the MOSFET 142 included in the first switch unit 140 while the holding circuit is on.

When a low-level comparative output signal (the off-signal) output from the second comparison unit 132 or a low-level NAND signal (the off-signal) output from the second switch unit 160 is supplied from the input terminal, the holding circuit 150 releases the hold on the on-state and maintains the on-state released until the on-state signal is input. The holding circuit 150 applies the off voltage (voltage below the gate threshold voltage) to the gate terminal of the MOSFET 142 of the first switch unit 140 while the on-state is released.

The first switch unit 140 is an example of a "switch". The first switch unit 140 is connected to one end of the electromagnetic actuator 110 (the end opposite the end to which the power supply terminal 102 is connected) and switches the supply of the drive current to the electromagnetic actuator 110 on and off. The first switch unit 140 is configured to include the MOSFET 142. The gate terminal of the MOSFET 142 is connected to the output terminal of the holding circuit 150. The drain terminal of the MOSFET 142 is connected to one end of the electromagnetic actuator 110. The source terminal of the MOSFET 142 is grounded via a current sensing unit 170. The MOSFET 142 switches between the on-state, in which the drive current is supplied to the electromagnetic actuator 110, and the off-state, in which the drive current is not supplied to the electromagnetic actuator 110, depending on the voltage applied to the gate terminal from the holding circuit 150. Specifically, the first switch unit 140 is in an off-state, in which no drive current is supplied to the electromagnetic actuator 110, while the off-voltage is applied to the gate terminal from the holding circuit 150. The first switch unit 140 is turned on when a drive current is supplied to the electromagnetic actuator 110 while the on-voltage is applied to the gate terminal from the holding circuit 150.

[Operation Timing in Current Control Circuit 100]

FIG. 2 is a timing chart illustrating various operation timings in the current control circuit 100 according to the embodiment of the present invention.

As illustrated in FIG. 2, in the current control circuit 100, the on-signal is output from the on-signal output unit 122 at a predetermined interval. In the current control circuit 100, the off-signal is output from the off-signal output unit 126 at the predetermined interval.

As illustrated in FIG. 2, the on-signal spacing is the same as the off-signal spacing. However, the output timing of the on-signal and the output timing of the off-signal have a phase difference so that the ratio of the on-period becomes a duty as desired (for example, 60% in this embodiment).

As illustrated in FIG. 2, the first target current value and the second target current value are set in the current control circuit 100. The first target current value is used as a threshold value for switching to the duty limiting mode when the drive current flowing through the electromagnetic actuator 110 reaches the first target current value in the starting mode. The second target current value is higher than the first target current value and is used as a threshold value for maintaining the drive current flowing through the electromagnetic actuator 110 to the second target current value in the constant current control mode.

<Start-Up Mode>

As illustrated in FIG. 2, the current control circuit 100 operates in a start-up mode (an example of "first mode") after starting the supply of the drive current to the electromagnetic actuator 110 until the detected voltage reaches the first target voltage value. In this start-up mode, the current control circuit 100 controls the duty of the drive current to 100%. Specifically, in the current control circuit 100, the holding circuit 150 switches to the on-state at the timing (timing t1 in the drawing) when the on-signal is first output from the on-signal output unit 122, the MOSFET 142 of the first switch unit 140 switches to the on-state, and the supply of the drive current to the electromagnetic actuator 110 starts. Therefore, the drive state of the electromagnetic actuator 110 is switched on. In this start-up mode, since no off-signal is input from either the second comparison unit 132 or the second switch 160 to the holding circuit 150 (i.e., the off-signal output from the off-signal output unit 126 is not activated), the holding circuit 150 remains on. Accordingly, as illustrated in FIG. 2, in this start-up mode, the drive current flowing through the electromagnetic actuator 110 increases linearly at a constant rate of increase due to the inductance of the electromagnetic actuator 110, without the driving state of the electromagnetic actuator 110 being switched off. Accordingly, in this start-up mode, the detected voltage value detected by the current sensing unit 170 increases linearly at the constant rate of increase.

<Duty Limit Mode>

As illustrated in FIG. 2, the current control circuit 100 operates in a duty limit mode (an example of the "second mode") during the period from the time when the detected voltage value reaches the first target voltage value until the detected voltage value reaches the second target voltage value (timing t2 to t5 in the drawing). In this duty limit mode, the current control circuit 100 controls the duty of the drive current to a predetermined duty (e.g., 60%), which is less than 100%.

Specifically, in the duty limit mode, when the off-signal is output from the off-signal output unit 126 (timing t3 in the drawing), the off-signal is supplied from the second switch unit 160 to the holding circuit 150, and the holding circuit 150 is switched to a state in which the holding circuit 150 is released from holding the on-state. Therefore, the MOSFET 142 of the first switch unit 140 is switched off, and the supply of the drive current to the electromagnetic actuator 110 is stopped. Thus, the drive current of the electromagnetic actuator 110 decreases linearly at a constant rate.

Thereafter, when the on-signal is output from the on-signal output unit 122 (the timing t4 in the drawing), the on-signal is supplied to the holding circuit 150 and the holding circuit 150 switches to the on-state. Thus, the MOSFET 142 of the first switch unit 140 switches on, and the supply of the drive current to the electromagnetic actuator 110 starts. This causes the drive current flowing through the electromagnetic actuator 110 to increase linearly at a constant rate due to the inductance of the electromagnetic actuator 110.

Thereafter, similarly, the supply of the drive current to the electromagnetic actuator 110 is stopped at the timing when the off-signal is output from the off-signal output unit 126, and the supply of the drive current to the electromagnetic actuator 110 is started at the timing when the on-signal is output from the on-signal output unit 122. This allows the duty of the drive current to be controlled to maintain a predetermined duty.

<Constant Current Control Mode>

As illustrated in FIG. 2, the current control circuit 100 operates in a constant current control mode (an example of a "third mode") after the detected voltage reaches the second target voltage value (the timing t5 or later in the drawing). In this constant current control mode, the current control circuit 100 controls the drive current at a constant current such that the drive current flowing through the electromagnetic actuator 110 is constant at the second target current value.

Specifically, in the constant current control mode, when the detected voltage value exceeds the second target voltage value (a timing t5 in the drawing), the off-signal is supplied from the second comparison unit 132 to the holding circuit 150, and the holding circuit 150 is switched to a state in which the holding circuit 150 is released. Therefore, the MOSFET 142 of the first switch unit 140 is switched off, and the supply of the drive current to the electromagnetic actuator 110 is stopped. Thus, the drive current of the electromagnetic actuator 110 decreases linearly at a constant rate.

Thereafter, when the on-signal is output from the on-signal output unit 122 (at timing t6 in the drawing), the on-signal is supplied to the holding circuit 150 and the holding circuit 150 is switched to the on-state. Thus, the MOSFET 142 of the first switch unit 140 switches on, and the supply of the drive current to the electromagnetic actuator 110 starts. This causes the drive current flowing through the electromagnetic actuator 110 to increase linearly at a constant rate due to the inductance of the electromagnetic actuator 110.

Thereafter, similarly, at a time when the detected voltage value exceeds the second target voltage value, the supply of the drive current to the electromagnetic actuator 110 is stopped, and the supply of the drive current to the electromagnetic actuator 110 is started at a time when the on-signal is output from the on-signal output unit 122. Accordingly, the drive current flowing through the electromagnetic actuator 110 is controlled to be constant at the second target current value.

As described above, the current control circuit 100 according to the present embodiment may operate in a first mode, in which the drive current is controlled to be 100% until the current value of the drive current reaches the first target current value after starting the supply of the drive current to the electromagnetic actuator 110, a second mode, in which the drive current is controlled to have a predetermined duty value of less than 100% after the current value of the drive current reaches the first target current value until the current value of the drive current reaches a second target current value higher than the first target current value, and a third mode, in which the drive current is controlled to be a constant current so that the current value of the drive current reaches the second target current value after the current value of the drive current reaches the second target current value so as to maintain the second target current value.

Accordingly, the current control circuit 100 according to the present embodiment can reach the first target current value of the drive current relatively early in the first mode after starting the supply of the drive current to the electromagnetic actuator 110.

In addition, the current control circuit 100 according to the present embodiment can maintain the duty of the drive current at a predetermined duty below 100% in the second mode until the current value of the drive current reaches the second target current value, so that potential failures (e.g., generation of an unpleasant noise, unstable duty, etc.) that may occur when the duty of the drive current is high can be suppressed.

According to the current control circuit 100 of the present embodiment, because the drive current quickly reaches the first target current value in the first mode and the duty of the drive current is maintained at a predetermined duty below 100% in the second mode, the rise time of the electromagnetic actuator 110 can be shortened while preventing a problem that may occur when the duty of the drive current supplied to the electromagnetic actuator 110 is high.

EXAMPLE ONE

Figure 3:
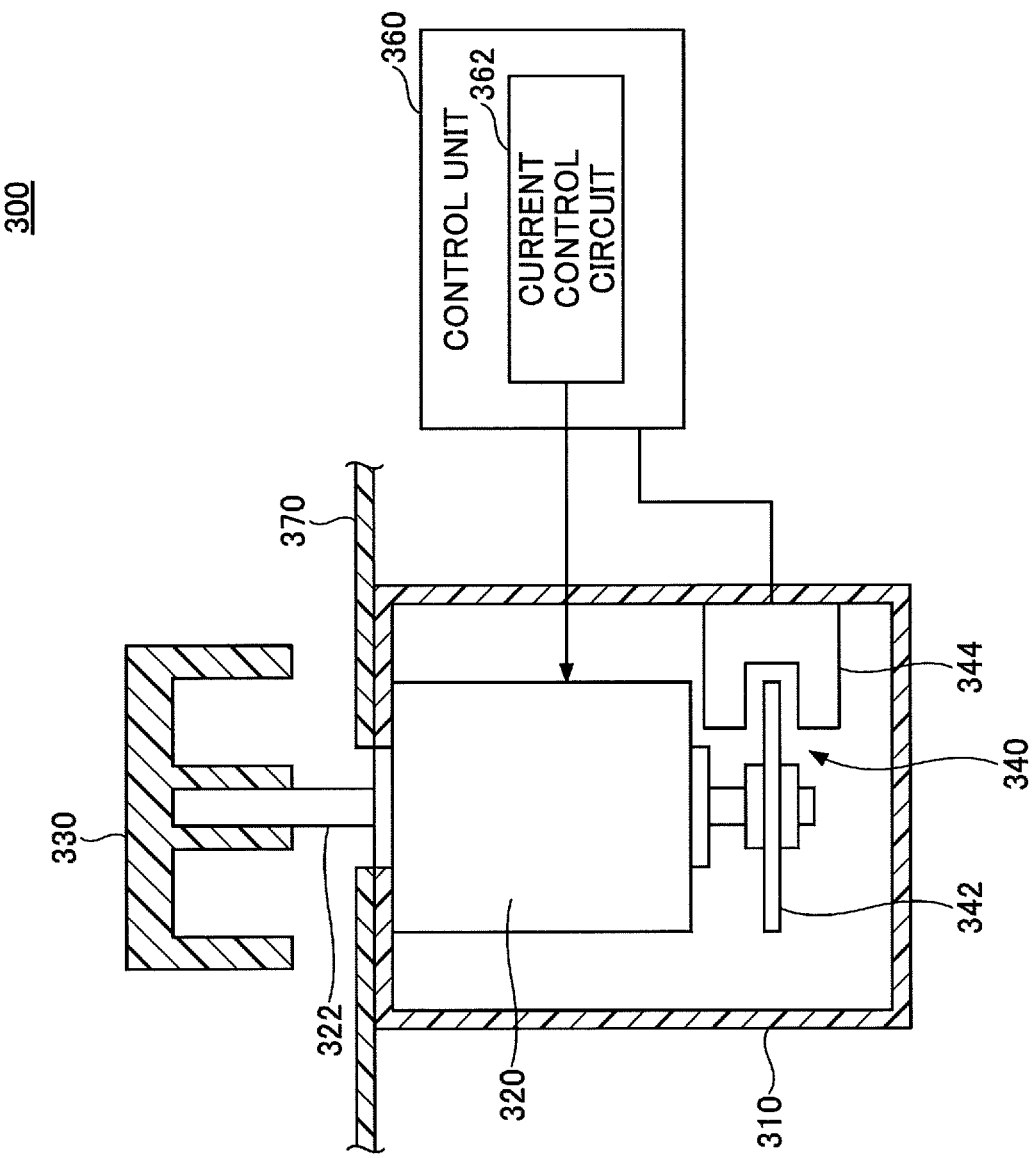
FIG. 3 is a schematic view of an input device according to an embodiment of the present invention.

FIG. 3 is a diagram illustrating a schematic configuration of the input device 300 according to the embodiment of the present invention. The input device 300 illustrated in FIG. 3 is an example of an "input device". The input device 300 illustrated in FIG. 3 is used, for example, to control a predetermined function of a predetermined electrical device mounted in a vehicle by rotational operation of a rotary knob 330.

As illustrated in FIG. 3, the input device 300 includes a casing 310, a motor 320, a rotary knob 330, a position sensor 340, and a control unit 360.

The casing 310 is a container-like member mounted within a panel 370 (e.g., a dashboard, console box, etc.) provided in the vehicle.

The motor 320 is an example of an "inductive load". A motor 320 is installed within the casing 310. The motor 320 has a drive shaft 322. One end of the drive shaft 322 protrudes outside of the panel 370. At one end of the drive shaft 322 is a rotary knob 330. The motor 320 can cause the position sensor 340 to detect an operation direction and an operation amount of the rotation operation by rotating the drive shaft 322 in accordance with a rotation operation of the rotary knob 330. The motor 320 can apply an external force to the rotary knob 330 by rotationally driving the drive shaft 322 through control from the control unit 360.

The rotary knob 330 is secured to the end of the drive shaft 322 that is outside the panel 370 and is an operation body that may be rotated by a user. For example, the rotary knob 330 is used as an adjustment knob for an electrical device (e.g., a radio, a car navigation system, etc.) mounted on a vehicle.

The position sensor 340 is provided within the casing 310 to sense the direction and amount of operation of the rotary knob 330 (i.e., the direction and amount of rotation of the drive shaft 322). The position sensor 340 may be, for example, an encoder, a variable resistor, or the like. In the example of FIG. 3, an optical rotary encoder that includes a position sensor 340 is illustrated, as a cord wheel 342, secured to the other end of a drive shaft 322 and a photo interrupter 344 mounted on the casing 310. The position sensor 340 outputs operation information representing the operation direction and the operation amount of the detected rotary knob 330 to the control unit 360.

The control unit 360 controls the input device 300 as a whole. For example, the control unit 360 controls a predetermined function of a predetermined electrical device mounted in a vehicle in response to operational information (direction and amount of operation of the rotary knob 330) sensed by the position sensor 340. For example, when a predetermined condition is satisfied (for example, when a predetermined operation is performed by the rotary knob 330), the control unit 360 supplies a drive current from the current control circuit 362 to the motor 320, thereby rotationally driving the drive shaft 322 of the motor 320 and applying an external force to the rotary knob 330.

The input device 300 is rotatably operated by the rotary knob 330 to control predetermined functions of the predetermined electrical devices mounted on the vehicle in accordance with the rotational direction and the rotational amount of the rotary knob 330 detected by the position sensor 340. When a predetermined condition is satisfied, the input device 300 is able to rotate the drive shaft 322 of the motor 320 and apply an external force to the rotary knob 330 by supplying the drive current from the current control circuit 362 to the motor 320. For example, the input device 300 may apply an external force to the rotary knob 330 to provide a sense of operation to the rotary knob 330 or to rotate the rotary knob 330 to a predetermined position.

Further, the input device 300 can reduce the rise time of the motor 320 by using a configuration similar to that of the current control circuit 100 illustrated in FIG. 1 for the current control circuit 362, while suppressing potential failures that may occur when the duty of the drive current supplied to the motor 320 is high. For this reason, the input device 300 can enhance the response of the operation of the motor 320 to the operation of the rotary knob 330 when, for example, the operation of the motor 320 provides a sense of operation to the rotary knob 330, so that the user does not have a sense of discomfort.

While an embodiment of the invention has been described in detail above, the invention is not limited to the described embodiment, and various modifications or variations are possible within the scope of the invention as defined in the appended claims.

For example, the current control circuit of the present invention is applicable not only to an input device capable of rotational operation, but also to any input device capable of applying an external force to the operation body by operation of the inductive load.

The current control circuit of the present invention is applicable not only to input devices, but also to any device other than input devices provided with an inductive load.

The current control circuit of the present invention is not limited to controlling the drive current of the motor, but is also applicable to the current control circuit for controlling the drive current of the inductive loads (for example, a solenoid, transformer, relay coil, etc.) other than the motor.

The current control circuit of the present invention is not limited to the circuit structure described in the embodiment. If the circuit has at least the first mode and the second mode, the current control circuit of the present invention may have other circuit structures.

According to one embodiment, the rise time of the inductive load can be shortened while suppressing failures that possibly occur when the duty of the drive current supplied to the inductive load is high.

Although the present invention has been described with reference to the above-described embodiments, the present invention is not limited to the above-described embodiments, and may be improved or modified for purposes of improvement or within the spirit of the invention.

DESCRIPTION OF SYMBOLS

100: Current control circuit
102: Power supply terminal
110: Electromagnetic actuator (inductive load)
122: On-signal output unit
124: Target value signal output unit
126: Off-signal output unit
130: First comparison unit
132: Second comparison unit
140: First switch unit
142: MOSFET
150: Holding circuit
160: Second switch unit
170: Current sensing unit
300: Input device
310: Casing
320: Motor (inductive load)
330: Rotary knob (operation body)
340: Position sensor
360: Control unit

What is claimed is:

1. A current control circuit for controlling a drive current supplied to an inductive load, the current control circuit being configured to perform
 a first mode of controlling a duty of the drive current so as to be 100% until a current value of the drive current reaches a first target current value after a supply of the drive current is started, and
 a second mode of controlling the duty of the drive current so as to be a predetermined duty below 100% until the current value of the drive current reaches a second target current value that is greater than the first target current value after the current value of the drive current reaches the first target current value wherein the current control circuit further comprising:
 an on-signal output unit that outputs an on-signal at a predetermined interval,
 a switch that is configured to switch on and off the supply of the drive current to the inductive load,
 a holding circuit that holds the switch in an on-state once the switch is switched on,
 an off-signal output unit that outputs an off-signal having a same interval as that in the on-signal and a phase difference with the on-signal, and
 a first comparison unit that compares the current value of the drive current with the first target current value and outputs a first comparison output signal that activates the off-signal output from the off-signal output unit when the current value of the drive current exceeds the first target current value,
 wherein the holding circuit begins holding the on-state of the switch at a timing when the on-signal is output from the on-signal output unit and releases the on-state of the switch at a timing when the off-signal is output from the off-signal output unit in conjunction with the off-signal being activated by the first comparison output signal so as to control the current value of the drive current to be a predetermined duty.

2. The current control circuit according to claim 1, the current control circuit comprising:
 wherein the holding circuit controls,
 in the first mode, the duty of the drive current so as to be 100% by holding the on-state of the switch from a time when the on-signal is output from the on-signal output unit until the current value of the drive current reaches the first target current value.

3. The current control circuit according to claim 1, the current control circuit being configured to further perform
 a third mode of conducting a constant current control of the drive current so that the current value of the drive current maintains the second target current value after the current value of the drive current reaches the second target current value, the current control circuit further comprising:
 a second comparison unit of comparing the current value of the drive current with the second target current value, and outputting a second comparison output signal of releasing the on-state of the holding circuit from holding when the current value of the drive current exceeds the second target current value,
 wherein the holding circuit performs the constant current control to cause the current value of the drive current to maintain the second target current value, in the third mode, by releasing the on-state of the switch from holding at a timing when the second comparison output signal is output from the second comparison unit and holding the on-state of the switch at a timing when the on-signal is output from the on-signal output unit.

4. An input device comprising:

an operation body;

the inductive load that applies an external force to the operation body; and the current control circuit according to claim 1 that controls the drive current supplied to the inductive load.

5. A current control circuit for controlling a drive current supplied to an inductive load, the current control circuit being configured to perform a first mode of controlling a duty of the drive current so as to be 100% until a current value of the drive current reaches a first target current value after a supply of the drive current is started, and a second mode of controlling the duty of the drive current so as to be a predetermined duty below 100% until the current value of the drive current reaches a second target current value that is greater than the first target current value after the current value of the drive current reaches the first target current value, wherein the current control circuit comprising:

an on-signal output unit that outputs an on-signal at a predetermined interval, a switch that is configured to switch on and off the supply of the drive current to the inductive load, and a holding circuit that holds the switch in an on-state once the switch is switched on;

wherein the current control circuit being configured to further perform:

a third mode of conducting a constant current control of the drive current so that the current value of the drive current maintains the second target current value after the current value of the drive current reaches the second target current value, wherein the current control circuit further comprising:

a second comparison unit of comparing the current value of the drive current with the second target current value, and outputting a second comparison output signal of releasing the on-state of the holding circuit from holding when the current value of the drive current exceeds the second target current value, wherein the holding circuit performs the constant current control to cause the current value of the drive current to maintain the second target current value, in the third mode, by releasing the on-state of the switch from holding at a timing when the second comparison output signal is output from the second comparison unit and holding the on-state of the switch at a timing when the on-signal is output from the on-signal output unit.

\* \* \* \* \*